United States Patent [19]

Huybrechts et al.

[11] Patent Number: 4,623,481
[45] Date of Patent: Nov. 18, 1986

[54] CONDUCTIVE PRIMERS

[75] Inventors: Jozef T. Huybrechts, Turnhout; August T. Timmerman, Westerlo, both of Belgium

[73] Assignee: E. I. Du Pont de Nemours & Company, Wilmington, Del.

[21] Appl. No.: 652,859

[22] Filed: Sep. 21, 1984

[51] Int. Cl.$^4$ .............................................. H01B 1/06
[52] U.S. Cl. .................................... 252/511; 523/468; 523/436; 523/427; 523/428
[58] Field of Search ............... 523/428, 427, 435, 436, 523/468; 252/511

[56] References Cited

U.S. PATENT DOCUMENTS

| | | | |
|---|---|---|---|
| 2,682,515 | 6/1954 | Naps | 523/428 |
| 3,655,595 | 4/1972 | Higashi | 428/478.2 |
| 3,819,567 | 6/1974 | Swanson et al. | 525/438 |
| 3,837,981 | 9/1974 | Flint | 428/189 |
| 3,928,156 | 12/1975 | Wismer et al. | 524/901 |
| 3,971,745 | 7/1976 | Carlson et al. | 524/440 |
| 3,992,346 | 11/1976 | Hartmann et al. | 525/438 |
| 4,065,316 | 12/1977 | Baron et al. | 525/481 |
| 4,115,599 | 9/1978 | Taylor | 525/524 |
| 4,160,064 | 7/1979 | Nordiff | 428/707 |
| 4,225,460 | 9/1980 | Newell | 528/73 |
| 4,237,252 | 12/1980 | Newell et al. | 528/58 |
| 4,354,911 | 10/1982 | Dodd et al. | 427/304 |

FOREIGN PATENT DOCUMENTS 0042625 4/1979 Japan .................................. 523/427

Primary Examiner—Josephine L. Barr
Attorney, Agent, or Firm—Richard H. Burgess

[57] ABSTRACT

An epoxyester linear block oligomer made with $n-1$ moles fatty acid units terminated with carboxylic acid groups and n moles of epoxy oligomer, when filled with carbon black, is a particularly effective electrically conductive primer for use over organic-based composites to be electrostatically painted.

6 Claims, No Drawings

CONDUCTIVE PRIMERS

BACKGROUND

This invention concerns polymers and paints. More particularly it concerns polyester-epoxy polymers filled with carbon black and particularly suited for use as electrically conductive coating compositions for use on automobiles, including nonmetallic parts.

The present invention is an adaption of and improvement over that of U.S. application Ser. No. 613,413 (FF-7795), Huybrechts, Meeus and Timmerman, filed May 24, 1984, now U.S. Pat. No. 4,602,053, the disclosure of which is incoporated herein by reference.

Coating systems for automobiles normally comprise a multiplicity of coatings applied to substrates of steel and sometimes also other materials, including electrically non-conductive organic-based composite materials. Typically, the steel is treated with a phosphate, than a cathodic electrocoat primer is applied. A primer-surfacer is used next to smooth the surface and provide a thick enough coating to permit sanding to a smooth, flat finish. Then a topcoat system is applied, sometimes as a single colored coat, often as a basecoat with solid color or metallic pigments followed by a clear coat.

When a non-conductive material is used for part of a car body, it is important to provide an electrically-conductive coating over it so that when the topcoat paint is applied electrostatically to the entire car, a uniform appearance will be produced. Among such non-conductive materials are reaction injection molded (RIM) parts and various fiberglass filled composites.

It is difficult to find a paint that can be made adequately conductive for such applications while still being tough and flexible enough to be a useful paint.

SUMMARY OF THE INVENTION

The present invention provides an electrically conductive coating composition comprising
  (a) 5-40% by weight of a block-copolymerized linear oligomer having an average of 3 to 20 mole units of alternating units of
    n moles of linear epoxy oligomers terminated with oxirane groups on each end and an $\overline{M}n$ in the range of 300-5000, and
    (n−1) moles of fatty acid units terminated with carboxylic acid groups on each of two ends and having at least 9 carbon atoms,
    said linear oligomer being terminated on each end with units of said epoxy oligomers,
  (b) 1-20% of a blocked isocyanate which can be unblocked in the coating composition by heating at temperatures not higher than 140° C.,
  (c) 1-30% of an aminoplast crosslinking agent,
  (d) 0-40% by weight of pigment and extenders,
  (e) 2-5% by volume based on binder solids of a conductive carbon black, and
  (f) 20-80% by weight of organic solvents, having a specific conductivity measured as a dry, cured film of at least $5 \times 10^{-3} (\Omega cm)^{-1}$.

Coated substrates are also part of the invention.

DETAILED DESCRIPTION

With coating compositions of the invention, the carbon black content was varied and the conductivity of the resulting coating was measured with a "Sprayability Meter" made by Ransburg Electro-Coating Corp. of Indianapolis, Ind. It was found that at least 2% carbon black by volume based on the total solids was needed to obtain electrostatic sprayability. The following table shows the Ransburg Conductivity rating for various levels of carbon black. A conductivity of at least 100 is needed for a coated substrate to be amenable to electrostatic spraying.

| % Carbon Black Volume | Ransburg Conductivity |
|---|---|
| 1 | 75 (not sprayable) |
| 1.5 | 75 (not sprayable) |
| 2 | 145 |
| 2.5 | 165 |
| 3 | 165 |

Furthermore, the resins of the present invention exhibit substantial toughness, chip resistance and flexibility, making them suitable for use with carbon black fillings as conductive coatings.

In the examples, parts and proportions are given by weight except where indicated otherwise.

EXAMPLE 1

Resin A—Block Epoxy Ester from Epon 1001 and Pripol 1014-dimer FA

| | |
|---|---|
| Epon 1001 epoxy resin (Shell) | 33.80 |
| Pripol 1014 dimerized fatty acid (Unilever) | 16.20 |
| Triethylamine | 0.05 |
| Methylisobutyl Ketone (MIBK) | 25 |
| heat at reflux (114–116° C.) until acid number (AN) = 6–10 visc Q-T (Gardner-Holdt bubble viscosity) at 50% solids in MIBK/CA blend = 1/1 | |
| Cellosolve acetate (CA) | 24.95 |
| | 100.00 |

The resulting resin was an oligomer containing 4 moles of $\overline{M}n$ 900 epoxy and 3 moles of $C_{36}$ dimerized fatty acid, for a total of 7 mole units, end terminated with epoxy.

EXAMPLE 2

Conductive Primer for Coating Bulk Molding Compound, Sheet Molding Compound and Polyamide

| Ingredient | Amount | Producer |
|---|---|---|
| Grinding stage | | |
| Block epoxy ester of Ex 1 | 29.73 | |
| Solvesso 150 | 10.32 | Essochem |
| Bentone 34 | 0.33 | Nat'l Lead |
| Carbon black XE-2 conductive carbon black | 1.11 | Phillips Petr. |
| Xylene | 16.69 | |
| Barytes (micronized) | 14.49 | Sachtleben |
| Zinc Oxide (American process) | 5.04 | De Craene |
| Aluminum silicate pigment | 4.23 | |
| Titanium dioxide pigment | 11.79 | |
| Guaiacol antioxidant | 0.67 | Rhone-Poulenc |
| MPA 60X thixotropic agent | 0.67 | Baker Caster Oil |
| Mineral spirits | 4.88 | Shell |
| | 100.00 | |
| Let down stage | | |
| Grind | 86.44 | |
| Maprenal MF590 melamine formaldehyde resin | 5.85 | Hoechst |
| Xylene | 1.00 | |
| Blocked isocyanate ketoxime-blocked aliphatic isocyanate | 3.84 | Bayer |

| Ingredient | Amount | Producer |
|---|---|---|
| Ethylene glycol butylether acetate | 2.87 | |
| | 100.00 | |

Reduce with Solvesso 150 to spray viscosity of 25-30 sec in Ford cup 4.

The resulting paint was sprayed onto non-conductive automobile parts and provided a tough coating which could be electrostatically sprayed with a topcoat.

We claim:

1. An electrically conductive coating composition comprising
   (a) 5-40% by weight of a block-copolymerized linear oligomer having an average of 3 to 20 mole units of alternating units of n moles of linear epoxy oligomers terminated with oxirane groups on each end and an $\overline{Mn}$ in the range of 300-5000, and (n−1) moles of fatty acid units terminated with carboxylic acid groups on each of two ends and having at least 9 carbon atoms, said linear oligomer being terminated on each end with units of said epoxy oligomers, (b) 1-20% of a blocked isocyanate which can be unblocked in the coating composition by heating at temperatures not higher than 140° C.,
   (c) 1-30% of an aminoplast crosslinking agent,
   (d) 0-40% by weight of pigment and extenders,
   (e) 2-5% by volume based on binder solids of a conductive carbon black, and
   (f) 20-80% by weight of organic solvents, having a specific conductivity measured as a dry, cured film of at least $5 \times 10^{-3} (\Omega cm)^{-1}$.

2. The coating composition of claim 1 wherein the block epoxy ester is the reaction product of a bisphenol A diepoxy resin with a $C_{36}$-based aliphatic diacid.

3. The coating composition of claim 1 wherein the blocked isocyanate is a ketoxime-blocked aliphatic isocyanate.

4. The coating composition of claim 1 wherein the crosslinking agent is selected from the group consisting of melamine formaldehyde resins, urea formaldehyde resins aand benzoguanamine formaldehyde resins.

5. The coating composition of claim 4 wherein the crosslinking agent is a reactive partially alkylated melamine formaldehyde resin.

6. A coated substrate comprising a substrate of an organic-based composite material coated with a cured coating composition of claim 1, giving an electrical conductivity of at least $5 \times 10^{-3} (\Omega cm)^{-1}$.

* * * * *